US008408769B2

(12) United States Patent
Nicolai et al.

(10) Patent No.: US 8,408,769 B2
(45) Date of Patent: Apr. 2, 2013

(54) OPTICAL MODULE FOR MOTOR VEHICLE HEADLAMP EQUIPPED WITH A DEVICE FOR ELECTRICAL CONNECTION TO REMOTE DEVICES

(75) Inventors: Jean-Marc Nicolai, Courbevoie (FR); Benjamin Touzet, Courbevoie (FR); Gregoire Sadoux, Asnieres sur Seine (FR); Jonathan Blandin, Les Pavillons Sous Bois (FR)

(73) Assignee: Valeo Vision, Bobigny (FR)

( * ) Notice: Subject to any disclaimer, the term of this patent is extended or adjusted under 35 U.S.C. 154(b) by 298 days.

(21) Appl. No.: 12/875,246

(22) Filed: Sep. 3, 2010

(65) Prior Publication Data
US 2011/0103086 A1 May 5, 2011

(30) Foreign Application Priority Data

Apr. 9, 2009 (FR) ..................................... 09 04222

(51) Int. Cl.
*F21V 21/14* (2006.01)
(52) U.S. Cl. ........ 362/523; 362/286; 362/287; 362/513; 362/524
(58) Field of Classification Search .......... 362/285–287, 362/512, 513, 523, 524
See application file for complete search history.

(56) References Cited

U.S. PATENT DOCUMENTS

| 4,941,258 | A | 7/1990 | Wright |
| 6,543,294 | B2* | 4/2003 | Stamps et al. ............... 73/729.1 |
| 6,648,494 | B2* | 11/2003 | Sugimoto et al. ............. 362/524 |
| 7,304,239 | B1 | 12/2007 | Harris et al. |
| 7,815,352 | B2* | 10/2010 | Naganawa et al. ........... 362/523 |
| 2002/0064054 | A1* | 5/2002 | Sugimoto et al. ............. 362/523 |

FOREIGN PATENT DOCUMENTS

| DE | 19910131 A1 | 9/2000 |
| DE | 102007050348 A1 | 8/2008 |
| WO | 0051844 A1 | 9/2000 |

* cited by examiner

*Primary Examiner* — John A Ward
(74) *Attorney, Agent, or Firm* — Jacox, Meckstroth & Jenkins

(57) ABSTRACT

An optical module equipping a motor vehicle lighting and/or indicating device, provided with a assembly structure movably assembled on a bracket and means of electrical connection to at least one remote device, wherein the optical module is equipped with an electrical connection device comprising a flexible element integrating electrical conductors, the flexible element is connected between the assembly structure and the bracket such that the points of mechanical connection together produce a freedom of movement limited in space.

16 Claims, 5 Drawing Sheets

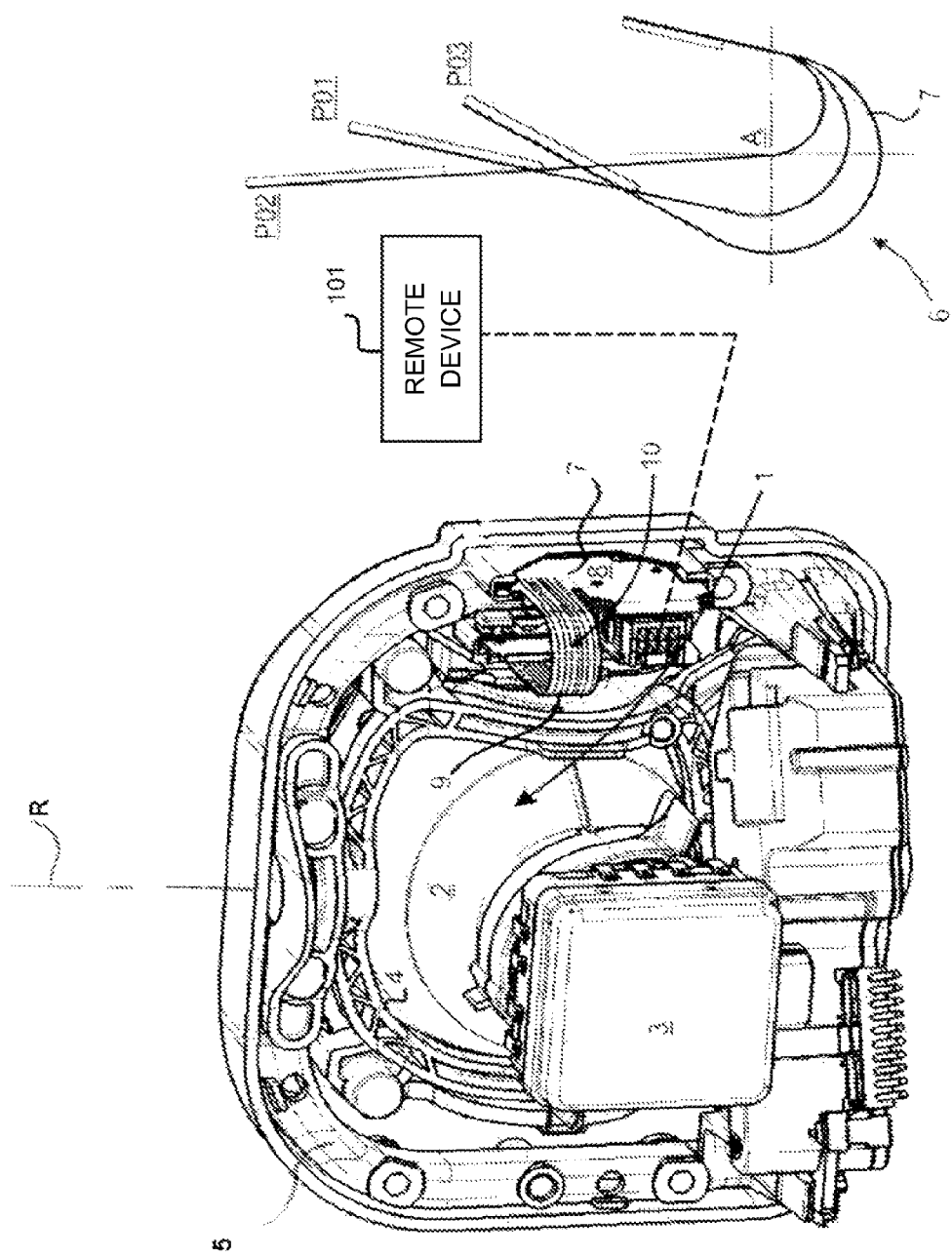

OPTICAL MODULE FOR MOTOR VEHICLE HEADLAMP EQUIPPED WITH A DEVICE FOR ELECTRICAL CONNECTION TO REMOTE DEVICES

CROSS-REFERENCE TO RELATED APPLICATIONS

This application claims priority to French Application No. 0904222 filed Sep. 4, 2009, which application is incorporated herein by reference and made a part hereof.

BACKGROUND OF THE INVENTION

1. Field of the Invention

The invention concerns the field of lighting devices, in particular for motor vehicles, and more particularly relates to headlamps equipping these vehicles. More specifically, the invention relates to the methods of electrical connection between an optical module equipping a motor vehicle headlamp and remote devices which are equally placed inside and/or outside the headlamp.

2. Description of the Related Art

Motor vehicle headlamps are generally composed of a housing which is closed by a transparent wall, through which one or more light beams emerge. This housing accommodates one or more optical modules which are assembled inside the housing by means of a bracket arranged in a chassis, plate or any other similar intermediate device which can bracket the optical module(s) and which is configured for their assembly inside the housing. Such a bracket can be an individual bracket assigned to one optical module or a collective bracket holding a plurality of these individual brackets. The optical modules each comprise a light generator comprising at least one light source associated with an optical system. The light source is any device able to emit light, such as a filament bulb, a gas-discharge bulb or also a device combining one or more light-emitting diodes (LEDs) which are advantageously clustered on a common electronic bracket. The optical system can modify at least one parameter of the light generated by the light source in order to emit the light beam by the optical module. The optical system comprises optical components such as a reflector, lens, diffuser, collimator or any other device that can modify at least one of the parameters of the light generated by the light source, such as its average reflection and/or its direction, or even a combination of a plurality of these elements. The optical module is equipped with various devices necessary for its operation, such as means to activate the light source(s) which it comprises, means of cooling and a substructure to carry all the components of the optical module. This substructure is used for assembling the optical module inside the housing by means of the bracket at least.

Among the optical modules intended to equip motor vehicle headlamps, some can be movably assembled on the housing. For example, the movable optical module is used for a dynamic bending light function (DBL), according to which the optical module is movably assembled on the housing with lateral reflector movement relative to the general axis of forward movement of the vehicle or longitudinal axis of the vehicle. These DBL functions can be applied to low beam functions, then called bending light or dynamic bending light (DBL), or to high beam functions, again called high beam DBL. For example, yet another known function lies in the dynamic range levelling of the optical module based on assembling the optical module so that it can move on the housing relative to the resting plane of the vehicle on the ground. Other complex functions are also known, according to which various optical modules are movably assembled on the housing and cooperate together in order to obtain selective illumination of the traffic lane, in particular in order to avoid dazzling users of other oncoming vehicles or those being followed.

The optical module(s) are movably assembled on the housing by means of the bracket(s) which are allocated to them. Generally, it is to be considered that a movable optical module can be movably assembled so as to swivel on the housing about at least one axis corresponding to one of the directions in Euclidean space. The movable assembly of the optical module can be implemented according to various and non-specific embodiments, but inevitably induces the ability to move on other devices which are movably assembled jointly with the optical module. In particular, such devices are electrical devices individually fixed on one or more optical modules, such as the light sources and their means of activation, sensors and/or one or more electric motors.

There arises the problem of electrical connection between the devices fixed on the optical module and/or movably assembled jointly with the latter, with other devices which are arranged at a distance from the optical module. For example, the control means for operating the optical module are usually implemented at a distance from the latter, in any available space of the housing even outside the headlamp. In addition, the source of energy supply to the optical module is usually a remote source equipping the vehicle.

Usually, this electrical connection between the fixed and/or movable devices and the remote devices is provided by means of conductors with at least one electric flux. These electric fluxes in particular correspond to an electric current, a control signal or any other data signal that can be exchanged between the optical module and the remote electrical devices. Such conductors are in particular made of wire or cable.

Technological developments have complicated the methods of using the optical modules in order to provide them with advantageously new capabilities and functions, the number of electric fluxes inevitably increasing. For example, the methods for activating the light source(s) are increasingly sophisticated, in particular based on the selective activation of the LEDs used to generate the light emitted by the headlamp. Certain elliptical modules also comprise movable covers to modify the shape of the beam generated by the module, their control can be complex to a greater or lesser degree and numerous electric fluxes must be conducted to the module.

According to a traditional technique, the conductors are combined in at least one multi-cable hose. This assembly, in the present application, is called round cable. Such a hose has the advantage of being robust but the disadvantages of being rigid and comprising a limited number of cables. The rigidity of the cables is not favorable as regards the freedom of movement of the optical module, and their restricted number limits the potential amount of electric fluxes which they can conduct.

SUMMARY OF THE INVENTION

The aim of this invention is to propose an improvement as regards the electrical connection of an optical module contained in a motor vehicle headlamp to devices remote from this optical module. More particularly, the present invention is directed at proposing such a solution which takes account of the constraints which have been experienced, while enabling the transmission capacities of control commands for operating the various electrical devices contained in the optical module to be optimized and while offering long-term durability of the electrical connection proposed despite possible frequent and repeated movements of the optical module inside the housing within the scope of the movable assembly of the optical module inside a housing of the headlamp.

An object of the invention is an optical module equipping a motor vehicle lighting and/or indicating device, comprising a light generator comprising at least one light source associated with an optical system, this optical module being provided with an assembly structure movably assembled on a bracket and means of electrical connection to at least one remote device. The optical module according to the invention is equipped with an electrical connection device comprising a flexible element integrating electrical conductors, the flexible element being connected between the assembly structure and the bracket so that the points of mechanical connection together produce a freedom of movement limited in space in comparison with a round cable type connection, the flexible element being more wide than thick and comprising conductors ensuring the electrical connection.

The invention thus enables means of electrical connection to be implemented, comprising a plurality of conductors which are each designated to conduct an electric flux, at the same time reducing the freedom of movement of the electrical connection. Thus, despite the fact that the connection is still required to move, the latter is subjected to fewer random movements and fewer torsions in comparison with a round cable. The durability of the electrical connection is thus increased. This is particularly interesting in the context of a DBL module, which is frequently required to move.

Such an electric flux corresponds in particular to an electric current, a control signal or any other signal concerning data that can be exchanged between the optical module and remote electrical and/or electronic devices. Such remote devices are more particularly control means to operate the optical module and/or a source of electrical energy.

The assembly structure can be a substructure, on which the reflector is fixed. The reflector can also be the assembly part itself. In the latter case, the reflector then has means for fixing to the bracket. For example, the reflector can include studs that engage in openings of the bracket to allow the reflector to rotate relative to the bracket.

According to an alternative embodiment, the flexible element has a shape of a sheet type. Sheet type shape is understood to mean an object having narrow thickness with respect to its width and its length, comprising two substantially parallel principal faces, the distance between them corresponding to the thickness of the sheet. The principal faces of the sheet, as understood in the present application, each correspond overall to a surface (overall in the sense that they may nevertheless include nibs, such as flutes, that are thinner than the thickness of the sheet), the latter being a developable and regulated surface and able, by simple deformation, to be shaped in planform without being elongated or torn. In other words, this surface will have a planform which has been subjected to transformations, without being elongated or torn.

Thus, the flexible element constitutes a guidance device for the electrical conductors which it contains, movable relative to the deformation both in amplitude as well as along an authorized direction of movement of the optical module. The flexible element prevents the conductors from moving along certain directions, unlike a round cable connection. In particular, such rigidity prevents deformation of the conductors in any direction. The extension of the conductors along the flexible element corresponds more particularly to their extension parallel with the surfaces corresponding to the faces of the flexible element, while accompanying the conformation imposed on the latter.

Mechanical protection and movement guidance provided by the flexible element allow the use of conductors combined in very large numbers on the flexible element, with the advantage of optimizing the number of electric fluxes that can be exchanged between the optical module and the remote devices. Even if the conductors are thin, their use is reliable and durable, also in the case of frequent, repeated and alternating movements of the optical module, by virtue of the mechanical protection provided by the flexible element.

The invention, and more particularly when the flexible element has a shape of the sheet type, is thus particularly suitable for modules for which numerous electric fluxes must be conducted to the optical module. The module could thus be an elliptical module, comprising a stepping motor to cause a cover comprising various cut-off edges to move. This motor will receive the various electrical commands for positioning the cover and its supply of power. Such a stepping motor is considered more reliable and more accurate than a DC motor and causes step adjustment of the mobility of the cover according to various positions. It is also possible to fix a second motor on the assembly structure, actuating the movement of the assembly structure relative to the bracket, such that this motor is also caused to rotate. The electrical connection according to the present invention will also enable this second motor to be supplied with energy and the various control signals to be sent to it. The flexible element will also be able to contain conductors supplying the light source(s) of the optical module with energy. For example, again the methods of activating the light source(s) could be perfected, in particular on the basis of selective activation of light-emitting diodes (or LEDs) used to generate the light emitted by the headlamp. The flexible element can also contain conductors to transmit the sensor signals dependent on the movement of the assembly structure. The control means to operate the optical module are usually implemented at a distance from the latter, in any available space of the housing, even outside the headlamp. In addition, the source of energy supply for the optical module is usually a remote source equipping the vehicle. The flexible element thus allows an optical module requiring numerous electric fluxes to be connected, without increasing the rigidity of the electrical connection and while limiting the possibility of the latter to move, thus increasing its reliability.

If the flexible element has a shape of a sheet type, the latter can take various forms, for example that of a ribbon, sheet or other forms.

It should be understood that according to certain variants, the flexible element can comprise a plurality of successive flexible zones about respective axes of deformation. These axes of deformation are alternately parallel axes and/or convergent axes, the flexible element able to comprise reference zones which mechanically protect the conductors locally against any deterioration of one or other of the various flexible zones of the flexible element corresponding to the various axes of deformation which are associated therewith.

The flexible element is fixed to the assembly structure of the optical module, for example a substructure or the reflector itself, and with a bracket of the optical module on which the assembly structure is movably assembled. The bracket can be integral with the housing while being used for the individual movable assembly of the optical module and/or can be a collective bracket carrying a plurality of optical modules individually assembled movably or fixed on this collective bracket. According to certain variants, the bracket itself can be movably assembled on the housing. In certain variants, this bracket forms a general bracket for the plurality of optical modules, while being able to be equipped with an electrical connection device according to the invention which is also firmly held on a device integrally fixed to the housing.

If the flexible element has the shape of a sheet type, a median surface located halfway between the two faces of the flexible element can be defined, the shortest distance between these faces corresponding to the thickness of the flexible element.

Preferably, the flexible element is provided with mechanical means of fastening respectively assigned for its fixing on the assembly structure and on at least the bracket. These means of fastening could be adapted to increase the surface area for fixing the flexible element and thus further restrict its possibilities for movement. For example, in the case of a flexible element having the shape of a sheet of a ribbon-type, the fixing of the edge at each end of the flexible element, that is to say, to the assembly structure on one side and to the bracket on the other, enables the deformation of the flexible element to be limited: either the flexible element is curved on one side of a plane passing through the two extreme edges or it is curved on the other side.

According to an alternative even more advantageous embodiment, the flexible element has a shape of a sheet type, and these mechanical means of fastening allow, at least partially, the flexible element to be maintained, such that the median surface of the flexible element comprises, in the curved part, at least one straight line substantially parallel with a rotational axis of the assembly structure in relation to the bracket. In this case, the deformation will be more limited, thus further increasing the reliability and durability of the electrical connection. According to an alternative embodiment, improving the reliability and durability of the electrical connection even further, this rotational axis is substantially vertical, whereas the optical axis of the light generator is substantially horizontal.

According to another embodiment, it is also possible to produce a module in which this rotational axis is substantially horizontal, whereas the optical axis of the light generator is substantially horizontal. Such an embodiment is used, for example, within the scope of a module having the benefit of dynamic range levelling, that is to say, dependent on the relief of the road, acceleration and braking.

According to an alternative embodiment, the assembly structure can move between a first extreme position and a second extreme position, and the fixing elements are arranged in such a way and the sheet has a size such that the sheet is arched. This enables the deformation movement of the flexible element to be imposed.

The flexible element is again advantageously equipped with connectors which are electrically connected at the respective ends of the conductors and which can cooperate with complementary connectors respectively allocated to the optical module and the remote device. Such complementary connectors, and more particularly the one allocated to the remote device, are able to equip a fixed section of the overall wiring connection.

According to an alternative embodiment, the flexible element is provided with plates which constitute devices for integrating with the flexible element the mechanical means of fastening of the flexible element. In addition to greater constructional simplicity, fixing is flat and thus improves resistance to wear and tear.

According to an alternative embodiment, these plates are directed along parallel planes and locally for their implementation on the flexible element along respective planes parallel with the median surface of the flexible element. These plates in particular are joined to the flexible element by means of assembly, which are of the type such as bonding, clipping, embedding, dovetailing, and/or co-operation between fixing devices such as by screwing.

The plates advantageously constitute devices for joining the flexible element, means of fastening and/or connectors. In particular, such plates are robust devices placed at least at the ends of the flexible zone of the flexible element, if not at the ends of the flexible element.

More particularly, at least two plates are joined to the flexible element on both sides of its flexible zone. Such plates advantageously constitute devices to reinforce the flexible element against its deformation in the structural plane of the sheet.

According to an alternative embodiment, the flexible element comprises an extension of its flexible zone which is provided at its free end with a plate carrying the connector allocated to the optical module.

The flexible element advantageously comprises devices for mechanically protecting the conductors, which are disposed on either side of the flexible zone of the flexible element. The protection of the conductors is reinforced at the ends of the flexible zone of the flexible element, in their zones that are most stressed during their movement induced by the mobility of the optical module. According to an alternative embodiment, the plates comprise an edge where the flexible element joins the corresponding plate, this edge having a curve to avoid contact between a projecting edge and the flexible element during the movement of the assembly structure. To make this contact even less abrasive with respect to the flexible element, this edge is preferably cylindrical and is oriented towards where the ends of the flexible element converge.

According to an alternative embodiment, the flexible element is a flat cable. The electrical conductors are combined and coated with a synthetic material, such as a polymer, to form a sheet. The electrical conductors are preferably of the laminated conductor type. Such a sheet allows the use of many conductors in a tolerable overall dimension and can be used to achieve complex control of devices to be operated.

According to another alternative embodiment, the flexible element is a flexible printed circuit. The conductors are conductive tracks advantageously integrated into the flexible element, being applied on the flexible element by deposition of a conductive material, copper for example. Such a deposition of conductive material is covered with a film of insulating material. The conductors can be numerous without taking up a large volume on the flexible element and/or creating a mass that could inhibit the mobility of the optical module. According to an alternative embodiment, the conductors are integrated into the flexible element, being applied by electrolytic deposition of a conductive material on at least one face of the flexible element. According to a preferred alternative embodiment, the conductive tracks of the flexible printed circuit are produced by laminar deposition of a conductive material on at least one of its faces. The conductive tracks formed by laminar deposition are indeed more robust, and offer durable resistance in particular against any flexion-rotation movement about the axis of deformation at least.

Preferably, when the flexible element is a flat cable or a flexible printed circuit, the flexible element is covered with a layer of conductive material connected to the mass, so as to limit any electromagnetic emissions by the electrical connection. It can involve a protective film for example. Of course, this layer of conductive material is electrically insulated from the electrical conductors ensuring the transmission of the electric control or energy supplying fluxes to the optical module. According to an alternative embodiment, when the flexible element is a flexible printed circuit, the faces of the flexible printed circuit are coated with a conductive ink to ensure protection against electromagnetic radiation. According to an alternative embodiment, when the flexible element is a flat cable, it can be covered with a metallic layer, such as a metal sheet, sufficiently thin to maintain the flexibility of the flexible element.

According to an exemplary embodiment, the flexible element also comprises electronic components.

According to an exemplary embodiment, the flexible element allows an electrical connection between, on the one hand, the electronic components, for example LEDs, and/or electrical devices, such as motors, fixed on the assembly structure and, on the other hand, a control module fixed to the bracket.

According to an exemplary embodiment, the optical module according to the present invention is a module intended to fulfill a DBL function, the movement between the assembly structure and the bracket being intended to provide the optical module with a DBL function. The optical module is movably assembled with lateral reflector movement relative to the bracket.

The present invention also relates to a motor vehicle lighting and/or indicating device comprising at least one optical module as has just been described.

According to an alternative embodiment, the lighting and/or indicating device comprises a complementary means of connection between the bracket and the remote devices of the optical module, the electrical connection between the assembly structure and the bracket being more flexible than the complementary means of connection.

Such a lighting device particularly comprises a housing accommodating at least one movable or fixed optical module equally assembled on the housing. The bracket of the optical module is also equally an individual bracket and/or a collective bracket carrying a plurality of optical modules. Such a staged assembly of the brackets results particularly in an increase in the possibilities of movable assembly of one or more optical modules inside the housing. The electrical connection device in particular is placed between the assembly structure of the optical module, and at least the intermediate bracket between the optical module and the housing of the headlamp.

These and other objects and advantages of the invention will be apparent from the following description, the accompanying drawings and the appended claims.

BRIEF DESCRIPTION OF THE ACCOMPANYING DRAWINGS

Exemplary embodiments of this invention will be described with reference to the figures of the appended drawings wherein:

FIG. 1 is an illustration in rear perspective of an optical module for motor vehicle headlamps equipped with an electrical connection device according to an embodiment of this invention;

FIG. 2 is a diagrammatic illustration of possibilities for the flexion movement of an electrical connection device of this invention;

DETAILED DESCRIPTION OF THE PREFERRED EMBODIMENTS

Figure 3:
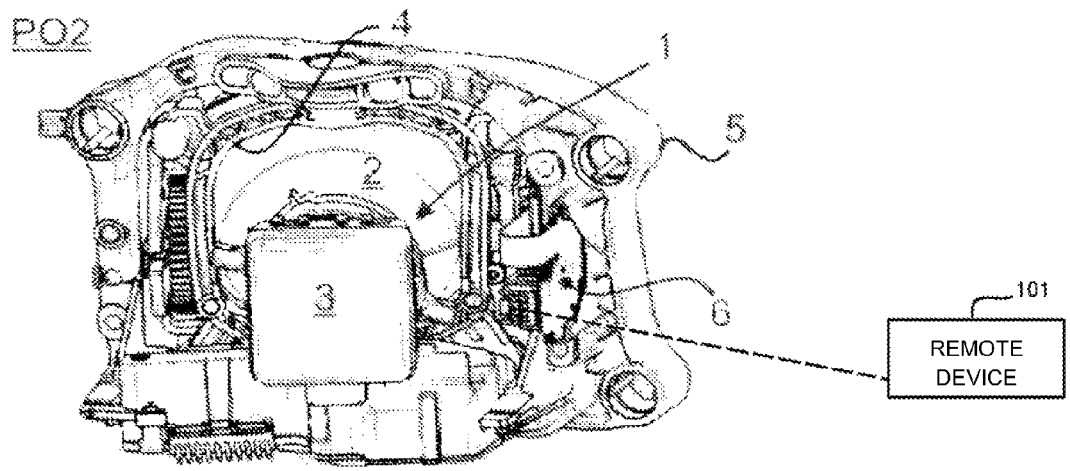
FIGS. 3 to 5 are illustrations in rear perspective of the optical module illustrated in FIG. 1, according to various respective positions of lateral orientation.
Figure 6:
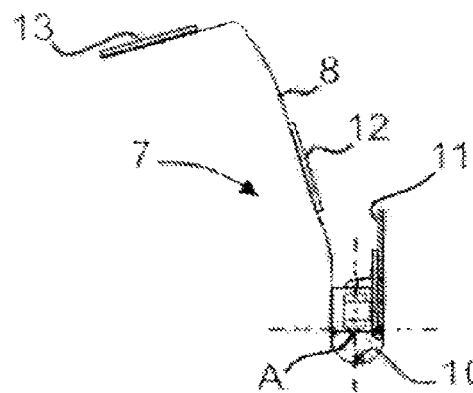
FIGS. 6 to 8 are diagrammatic illustrations of an electrical connection device equipping the optical module illustrated in FIG. 1, in positions corresponding to the various positions of this optical module illustrated in FIGS. 3 to 5, respectively.
Figure 9:
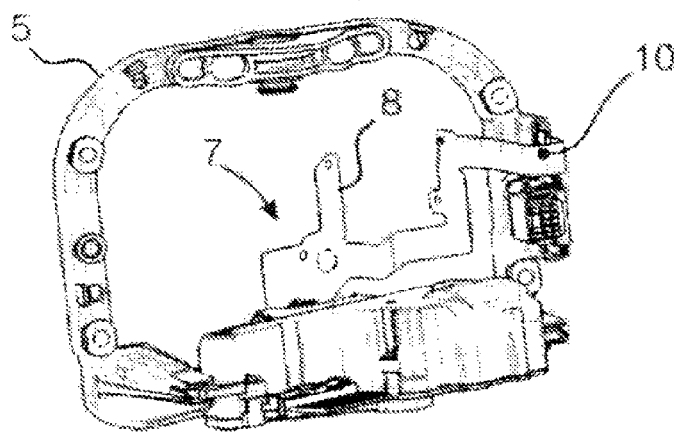
FIGS. 9 to 11 are illustrations similar to FIGS. 3 to 5, respectively, with the optical module removed to show more clearly the electrical connection device with which it is equipped.

In FIG. 1, an optical module 1 is intended to equip a lighting device of a motor vehicle, such as a headlamp. This optical module 1 comprises a light generator comprising an optical system 2 co-operating with a light source 3. In the example illustrated, the light source is a gas-discharge bulb, but other light sources could be applied to the present invention, such as for example LED or halogen bulbs. The optical module 1 is equipped with various devices necessary for its operation, such as means to activate the light source(s) 3 which it contains and an assembly structure or substructure 4 carrying all the components of the optical module 1. In the example illustrated this assembly structure 4 is a substructure on which the reflector of the optical system 2 is fixed. This substructure 4 is used to assemble the optical module 1 inside a housing of the headlamp by means of a bracket 5. In the exemplary embodiment illustrated, this bracket 5 individually movably carries the optical module 1 by means of the substructure 4. An electrical connection device is placed between the bracket 5 and the optical module 1. This connection device is intended to electrically connect the optical module 1 with at least one remote device 101 (FIG. 1) to control its operation and/or to supply it with energy.

Figure 4:
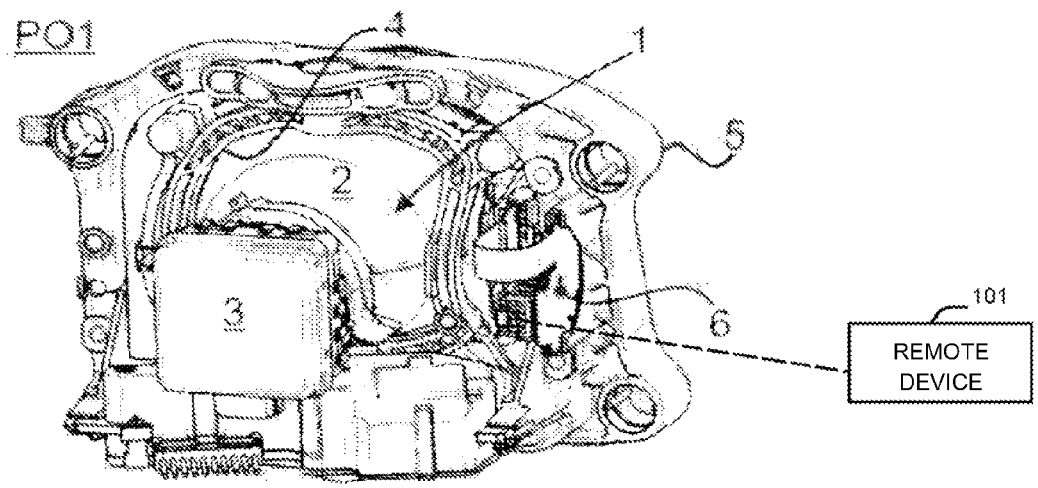
Figure 7:
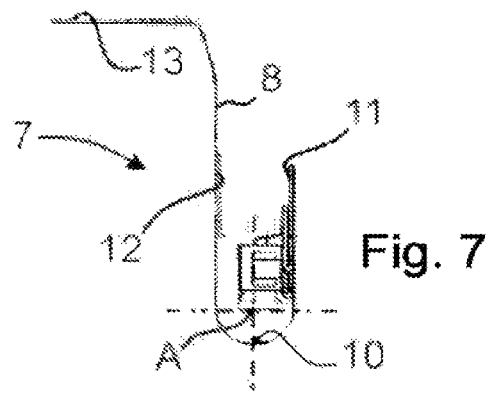
Figure 10:
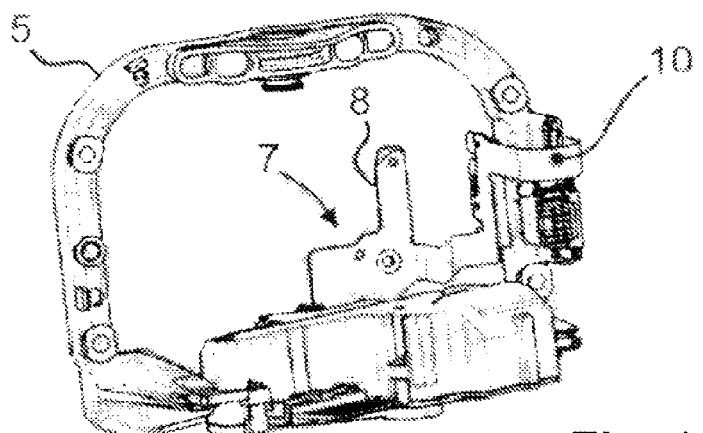
Figure 5:
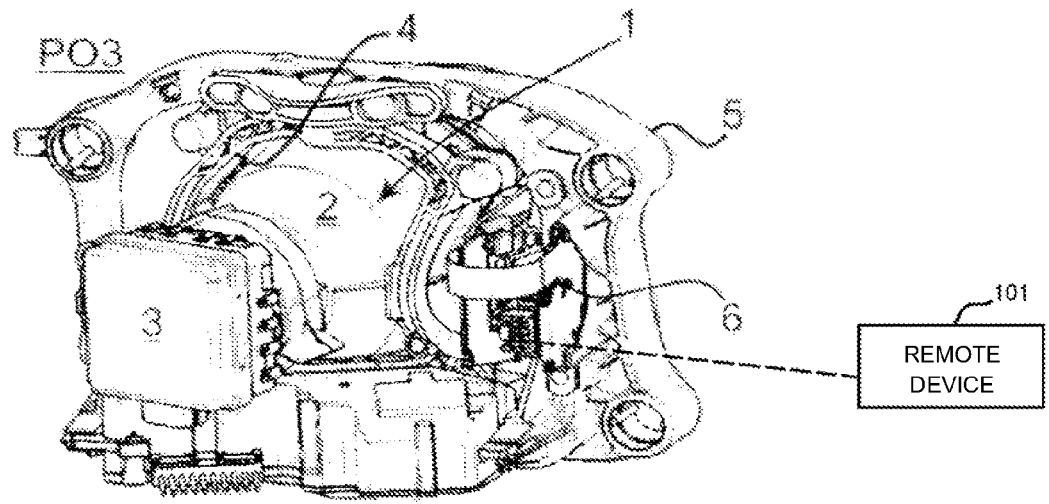
Figure 8:
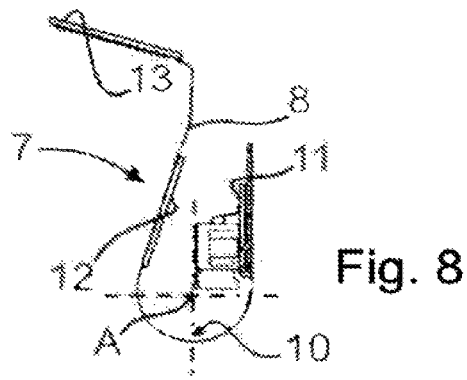
Figure 11:
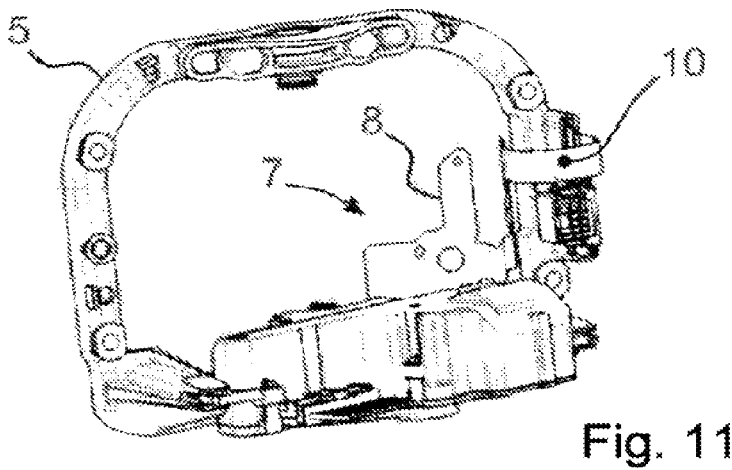

The views of the optical module 1 illustrated in FIG. 3 and FIG. 5 show, for example, the ability of the optical module 1 to move with lateral reflector movement, so as to fulfill a headlamp function known as DBL. In particular in FIG. 4, the optical module 1 is illustrated in a median position of movement PO1, while in FIG. 3 and FIG. 5, the optical module 1 is illustrated with lateral reflector movement towards the left PO2 and towards the right PO3 respectively. It should be noted that FIGS. 3 and 5 illustrate an alternative embodiment slightly differing from that illustrated in FIG. 1. The difference between these two variants is in the form of the bracket 5. The fixation of the substructure 4 to the bracket 5, however, is identical in both variants.

In FIG. 2, the electrical connection device 6 comprises a flexible element 7 having the shape of sheet type or sheet of narrow thickness. This sheet therefore allows a median surface parallel with the two faces of the sheet. The latter could be unrolled so as to be flat. Once the electrical connection is made, the sheet is bent, the median surface remaining developed and regulated. In the embodiment illustrated in FIG. 2, the median surface remains substantially vertical to the plane of the illustration page, that is to say, parallel with a given axis A, this axis A being vertical, whereas the optical axis of the light generator is horizontal. The flexible element 7 has an inflection zone giving it an arched shape. The flexible element 7 is thus deformable such that the median surface is substantially parallel with this axis A. Therefore, the flexible element 7 undergoes a deformation only in a single dimension of space. Thus, despite the repeated lateral reflector movements, the electrical connection will be much more reliable and wear resistant than a simple connection using an electric wire hose. The electrical connection is also very flexible despite the number of connectors which it contains.

In FIGS. 2 to 11, various deformation positions PO1; PO2; PO3 of the electrical connection device 6 are illustrated according to the corresponding positions taken up by the optical module 1 with lateral reflector movement.

Figure 12:
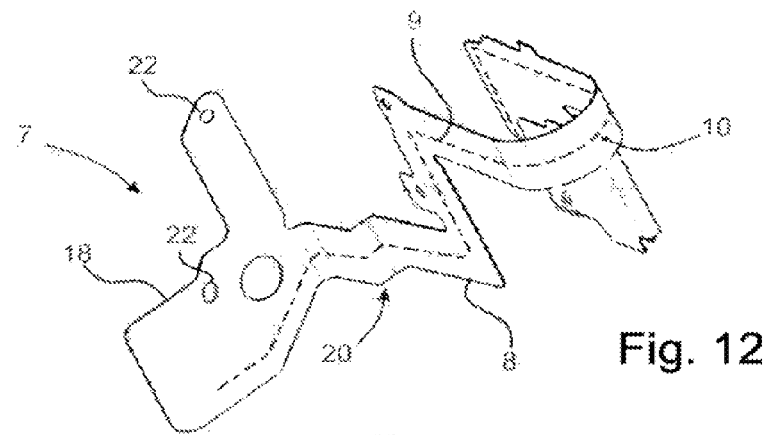
FIGS. 12 to 14 are illustrations in perspective which successively illustrate the assembly of various components of an electrical connection device according to an embodiment of this invention.

The flexible element 7 as illustrated in FIGS. 1 to 14 is a flexible printed circuit or flexboard comprising a bracket made of flexible material, for example made from polymer, into which conductors 9 are integrated. These conductors 9 are preferably integrated by laminar deposition of copper to form tracks, which are protected by an insulating coating. For the sake of clarity, in FIGS. 12 to 14, only one track is illustrated as a dotted line. FIG. 1 shows a plurality of tracks illustrated as dotted lines. The flexible element 7 comprises a localized inflection zone 10, being folded up on itself to impart its flexibility to the flexible element 7 while keeping the median surface substantially parallel with the axis A, whenever the module is turned about a rotational axis R parallel with axis A. This fold more particularly imparts a localized arched shape to the flexible element 7 in the inflection zone 10. The flexible element 7 thus has unique positioning options for any position of the optical module.

Figure 13:
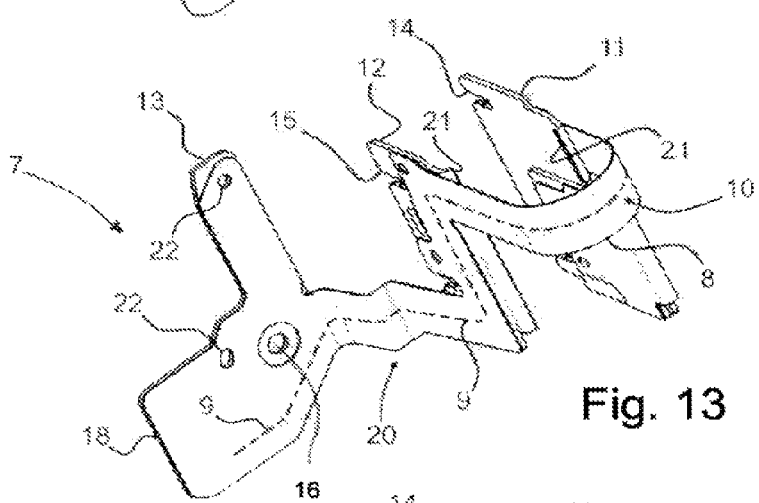
Figure 14:
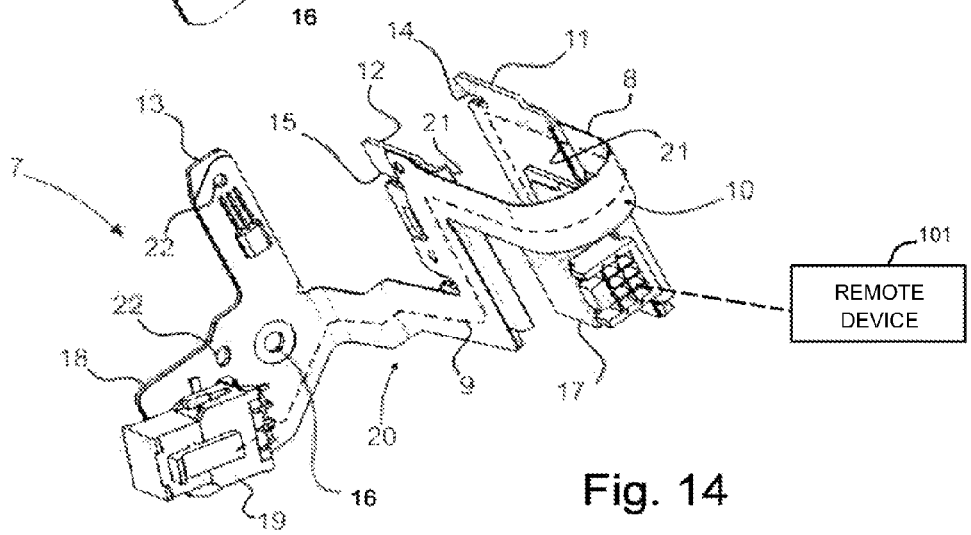

In FIG. 13 and FIG. 14, a plurality of plates 11, 12, 13 is fixed on the flexible element 7 to impart local rigidity on the flexible printed circuit. In the embodiment illustrated, these plates comprise mechanical means of fastening 14, 15, 16. The means of fastening 15 of a first plate 12 and the means of fastening 14 of a second plate 11 are provided for fixing the flexible element 7 respectively on the optical module 1 by means of the substructure 4 which it contains and on the bracket 5.

The flexible element 7 also has connectors 17, 19, a first connector 19 ensuring the connection of the flexible element to the optical module and a second connector 17 integral with the bracket 5 which connects the flexible element 7 to the electric power supply and to other control units, fixed in the housing of the headlamp or outside the latter.

In the exemplary embodiment of the electrical connection device 6 illustrated, the flexible element 7 is equipped with three plates 11, 12, 13. Two plates 11, 12 are joined to the flexible element 7 on both sides of the inflection zone 10 of the flexible element 7. In this inflection zone 10, the flexible element 7 is in the form of a ribbon. This form however is not restrictive. Such a position of these plates 11, 12 allows the zone of deformation of the flexible element 7 to be strictly defined in the inflection zone 10, located between the first plate 12 and the second plate 11.

The second plate 11 is an end plate of the flexible element 7, which has a connector 17 that can cooperate with a complementary connector allocated to one or more remote devices 101 to which the optical module 1 must be electrically connected. These devices in particular are the electric power supply to the headlamp and control signals transmitted from outside the headlamp and/or again other devices, which can be fixed on the housing of the headlamp, inside or outside the latter. The second plate 11 is fixed to the bracket 5. The electrical connection device 6 being structurally independent of this complementary conductor, the latter is thus not affected by the movements of the substructure 4 and the light generator, but only by those of the bracket 5. In the example illustrated, the substructure 4 is subjected to lateral reflector movement of the bending light, whereas the bracket 5 is moved only to correct the range and reference positioning of the optical module 1. The correction movement is much less extensive and less frequent than the reflector movement of the bending light. Consequently, the complementary conductor is much less stressed than the electrical connection device 6 between the bracket 5 and the substructure 4. Thus, it is possible to use a cable hose as a complementary connection. This alternative embodiment allows the electrical connection which connects the optical module 1 to remote devices 101 to be separated into a movable section consisting of the flexible element 7 and a not very movable section connecting the optical module 1 to these remote devices 101.

A third plate 13 is joined to the flexible element 7 at the other end of the flexible element 7, which extends beyond the first plate 12 to form an extension 18 of the flexible element 7 towards the means for activating the light source 3, such as one or more LEDs or a gas-discharge bulb, of the optical module 1. The extension can also have means for activating a motor device causing the mobility of the optical module 1.

The free final end of the extension 18 of the flexible element 7 has a connector 19 that can cooperate with a complementary connector allocated to the optical module 1, in this case the connector of the drive motor of a movable cover to produce a cut-off on the light beam emitted. According to the configuration of the optical module 1 and methods for implementing the electrical connection device between the substructure 4 and the bracket 5, the flexible element 7 can be easily adapted with respect to the substructure 4 and to the overall dimension available. Plate 13 thus allows the first connector 19 to be swerved movably with the optical module 1.

Plates 11, 12, 13 are in full contact with the flexible element 7, thus improving the deformation guidance of the flexible element 7. It should be noted that although the illustrated embodiment comprises three plates, this number is meant purely as an illustration.

The flexible element 7 and the plates 11, 12, 13 comprise means of positioning 22 co-operating with studs of the substructure or the bracket. The flexible element 7 and the plates comprise superimposed openings allowing centering pins to pass through in order to position the unit on the substructure or the bracket. The first plate 12 and the second plate 11 integrate the means of fastening 15 and 14 which, in this example, consist of embedding devices 14, 15. The means for fastening the third plate 13 are screwing means passing through openings 16. Of course, these fastening means are not restrictive.

In the inflection zone 10 of the flexible element 7, and more particularly on both sides of this inflection zone 10, conductors 9 are exposed to mechanical stresses against which it is desirable to protect them. The flexible element 7 is equipped with protection devices 21 to mechanically protect the conductors 9, which are arranged at the ends of the inflection zone 10 of the flexible element 7. In the exemplary embodiment illustrated these protection devices 21 are arranged on a rounded edge, obtained by folding the plates towards where each end of the inflection zone 10 converges. These rounded edges 21 prevent wear by shearing of the flexible element 7 against the edge of the plate during repeated rotational movements of the optical module 1 and thus further increase the durability of the electrical connection.

The structural organization of the electrical connection device 6 of the invention is particularly suitable for use within the scope of an optical module 1 which is movably assembled on the housing of a motor vehicle lighting and/or indicating device individually and/or jointly with other optical modules 1. The electrical connection device 6 is reliable and durable including for an optical module 1 subjected to frequent repeated and/or alternate movements within the scope of the use of its mobility on the housing. This electrical connection device 6 permits the number of electric fluxes that can be exchanged between the electrical devices placed on the optical module 1 to be optimized, such as the light source(s) and the means of activation, and/or at least one motor device, and those arranged at a distance from this optical module 1, electronic means in particular such as control means, and/or an electrical energy source of the vehicle. The electrical connection device 6 has a simple structure and is compact, despite the optimization offered as regards the number of electric fluxes that can be exchanged between the optical module 1 and the remote devices 101. The electrical connection device 6 is easy to implement inside the housing based on the means of fastening 14, 15, 16.

Moreover, in an alternative embodiment by implementing the flexible element as a flexible printed circuit, the electrical and electronic components can also be directly integrated in the electrical connection. Thus, one can have a single element effecting the electrical connection and comprising various electronic components controlling or taking part in the control of the optical module 1. In addition to more economic and simpler construction, this allows the weight to be reduced. This invention is particularly interesting within the scope of an optical module 1 fulfilling a bending light function and/or a dynamic levelling function, more particularly within the scope of the bending light function.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An optical module equipping a motor vehicle lighting and/or indicating device, comprising a light generator comprising at least one light source associated with an optical system, said optical module comprising:
   an assembly structure movably assembled on a bracket and means of electrical connection to at least one remote device, wherein said optical module is equipped with an electrical connection device comprising a flexible element integrating electrical conductors, said flexible element being connected between the assembly structure and the bracket, so that the points of mechanical connection together produce a freedom of movement limited in space in comparison with a round cable type connection, the flexible element being more wide than thick and comprising conductors ensuring the electrical connection.

2. The optical module according to claim 1, wherein said flexible element has a shape of the sheet type.

3. The optical module according to claim 1, wherein said flexible element is provided with mechanical means of fastening respectively assigned for its fixing on the assembly structure and on at least said bracket.

4. The module according to claim 3, wherein said flexible element has a shape of the sheet type, said mechanical means of fastening allowing, at least partially, said flexible element to be maintained, such that the median surface of said flexible element comprises, in the curved part, at least one straight line parallel with a rotational axis of said assembly structure relative to said bracket.

5. The optical module according to claim 4, wherein said rotational axis is substantially vertical, whereas the optical axis of the light generator is substantially horizontal.

6. The optical module according to claim 4, wherein said assembly structure can move between a first extreme position and a second extreme position, and in that the fixing elements are arranged in such a way and said sheet has a size such that said sheet is arched.

7. The optical module according to claim 3, wherein said flexible element is provided with plates which constitute devices for integrating with the flexible element said mechanical means of fastening of the flexible element.

8. The optical module according to claim 7, wherein said plates comprise an edge where the flexible element joins the corresponding plate, said edge having a curve to avoid contact between a projecting edge and said flexible element during the movement of said assembly structure.

9. The optical module according to claim 1, wherein said flexible element is a flat cable.

10. The optical module according to claim 1, wherein said flexible element is a flexible printed circuit.

11. The optical module according to claim 10, wherein conductive tracks of the flexible printed circuit are produced by laminar deposition of a conductive material on at least one of its faces.

12. The optical module according to claim 10, wherein said flexible element also comprises electronic components.

13. The optical module according to claim 9, wherein said flexible element is covered with a layer of conductive material, so as to limit any electromagnetic emissions by the electrical connection.

14. The optical module according to claim 1, wherein said flexible element allows electrical connection between, on the one hand, the electronic components and/or electrical devices fixed to said assembly structure and, on the other hand, a control module fixed to said bracket.

15. The optical module according to claim 1, wherein the movement between said assembly structure and said bracket is intended to provide said optical module with a DBL function.

16. A motor vehicle lighting and/or indicating device comprising at least one optical module according to claim 1.

* * * * *